(12) United States Patent
Paruszkiewicz et al.

(10) Patent No.: US 8,113,539 B2
(45) Date of Patent: Feb. 14, 2012

(54) AUTOMOTIVE SEAT TRIM COVER

(75) Inventors: William Joseph Paruszkiewicz, Clinton Township, MI (US); Louella Ann Patterson, Wales, MI (US); Thomas Allen Welch, Sr., Ortonville, MI (US); James Bradley Clauser, Oakland Township, MI (US); Paul S. Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 126 days.

(21) Appl. No.: 12/484,699

(22) Filed: Jun. 15, 2009

(65) Prior Publication Data

US 2010/0025970 A1    Feb. 4, 2010

Related U.S. Application Data

(60) Provisional application No. 61/084,587, filed on Jul. 29, 2008.

(51) Int. Cl.
*B60R 21/20* (2011.01)

(52) U.S. Cl. .................... 280/728.3; 280/730.2

(58) Field of Classification Search ............... 280/728.3, 280/730.2
See application file for complete search history.

(56) References Cited

U.S. PATENT DOCUMENTS

| | | | |
|---|---|---|---|
| 5,860,673 A * | 1/1999 | Hasegawa et al. | 280/730.2 |
| 5,938,232 A * | 8/1999 | Kalandek et al. | 280/730.2 |
| 5,988,674 A * | 11/1999 | Kimura et al. | 280/730.2 |
| 5,997,032 A | 12/1999 | Miwa | |
| 6,045,151 A * | 4/2000 | Wu | 280/728.3 |
| 6,050,636 A | 4/2000 | Chevallier | |
| 6,095,602 A * | 8/2000 | Umezawa et al. | 297/216.1 |
| 6,126,192 A | 10/2000 | Enders | |
| 6,206,410 B1 | 3/2001 | Brown | |
| 6,206,466 B1 | 3/2001 | Komatsu | |
| 6,213,498 B1 | 4/2001 | Ghalambor | |
| 6,213,550 B1 | 4/2001 | Yoshida | |
| 6,217,062 B1 | 4/2001 | Breyvogel | |
| 6,352,304 B1 | 3/2002 | Sorgenfrei | |
| 6,364,348 B1 | 4/2002 | Jang | |
| 6,451,233 B1 | 9/2002 | Byma | |
| 6,513,747 B1 | 2/2003 | Lee | |
| 6,588,838 B1 * | 7/2003 | Dick et al. | 297/216.13 |
| 6,725,509 B1 | 4/2004 | Lee | |
| 6,805,542 B2 | 10/2004 | Byma | |
| 7,134,685 B2 | 11/2006 | Panagos | |
| 7,134,686 B2 | 11/2006 | Tracht | |
| 7,195,274 B2 * | 3/2007 | Tracht | 280/728.3 |
| 7,195,277 B2 | 3/2007 | Tracht | |
| 7,281,733 B2 | 10/2007 | Pieruch | |
| 7,284,768 B2 | 10/2007 | Tracht | |
| 7,290,791 B2 * | 11/2007 | Tracht | 280/730.2 |
| 7,290,792 B2 | 11/2007 | Tracht | |
| 7,290,793 B2 | 11/2007 | Tracht | |
| 7,290,794 B2 | 11/2007 | Tracht | |
| 7,311,325 B2 | 12/2007 | Tracht | |
| 7,322,597 B2 | 1/2008 | Tracht | |
| 7,325,825 B2 | 2/2008 | Tracht | |
| 7,328,912 B2 | 2/2008 | Tracht | |
| 7,331,601 B2 | 2/2008 | Tracht | |
| 7,334,811 B2 | 2/2008 | Tracht | |

(Continued)

*Primary Examiner* — Toan To
(74) *Attorney, Agent, or Firm* — Brooks Kushman P.C.

(57) ABSTRACT

A trim cover for an automotive seat including an air bag includes a bolster and a side facing attached with the bolster to form a seam. At least a portion of the side facing includes a panel folded onto itself and joined along at least one edge, and is configured to direct the air bag, upon deployment, through the seam.

17 Claims, 4 Drawing Sheets

U.S. PATENT DOCUMENTS

| | | |
|---|---|---|
| 7,357,412 B2 | 4/2008 | Tracht |
| 7,377,542 B2 | 5/2008 | Tracht |
| 7,380,812 B2 | 6/2008 | Tracht |
| 7,390,015 B2 | 6/2008 | Tracht |
| 7,441,797 B2 | 10/2008 | Tracht |
| 7,445,234 B2 | 11/2008 | Hofmann |
| 7,458,603 B2 | 12/2008 | Buono |
| 2006/0113764 A1 | 6/2006 | Tracht |
| 2006/0131848 A1* | 6/2006 | Miyake et al. ............ 280/730.2 |

* cited by examiner

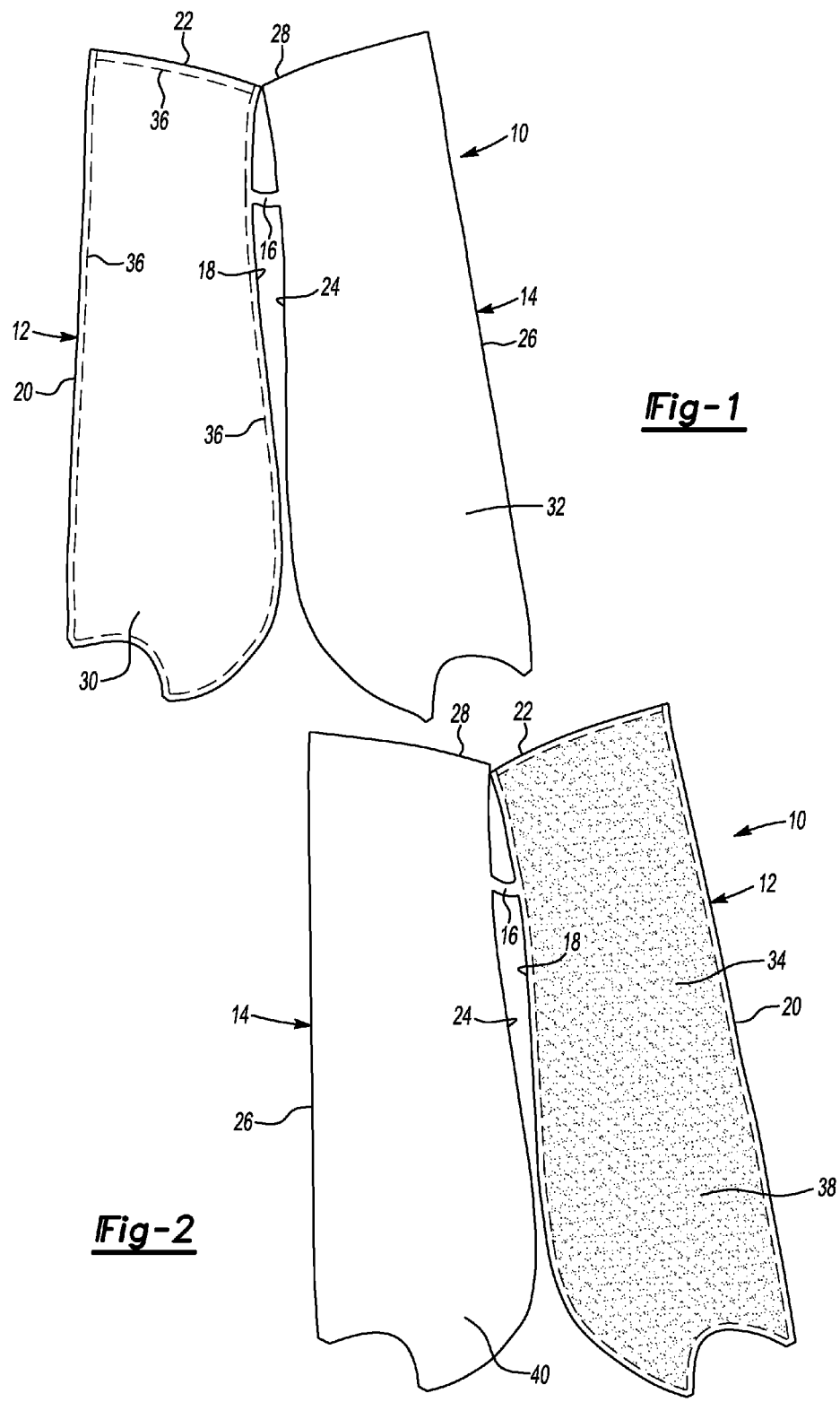

AUTOMOTIVE SEAT TRIM COVER

CROSS-REFERENCE TO RELATED APPLICATION

This application claims the benefit of U.S. Provisional Application No. 61/084,587, filed Jul. 29, 2008, which is hereby incorporated by reference in its entirety.

BACKGROUND

U.S. Pat. No. 7,458,603 to Buono et al. discloses an air bag guide for a vehicle seat component that includes flexible inner and outer panels having outer extremities located adjacent a release seam of a trim cover. The outer extremity of the flexible inner panel is secured to the trim cover. The outer extremity of the flexible outer panel is unconnected to the trim cover and curved to provide a guide flap.

U.S. Pat. No. 7,311,325 to Tracht et al. discloses a vehicle seat assembly that comprises a frame, a seat pad, a trim cover including a release seam, a connector to maintain the release seam in a closed position, and an air bag assembly within the trim cover. The air bag assembly includes an air bag inflatable to project outwardly through the air bag release seam when the air bag seam is in an opened position. The vehicle seat assembly further includes an air bag guide and a member comprising a first end portion secured to the air bag guide and a second end portion secured to the connector, with the member being movable in response to inflation of the air bag to break the connector to allow the tear seam to move to the opened position.

U.S. Pat. No. 5,860,673 to Hasegawa et al. discloses a seat structure having a side impact air bag apparatus integrated into a side portion of a seat back opposing a vehicle door. The air bag apparatus is activated at the time of a side impact such that a sewn portion of a seat surface layer breaks and an air bag body inflates between a side portion of a vehicle body and the side of a vehicle occupant. The sewn portion of the seat surface layer is formed by sewing a front seat surface layer for covering the front of the seat back to a side seat surface layer for covering the side of the seat back. A sheet member is provided inside the side seat surface layer integrally with the side seat surface layer. The sheet member is harder to stretch than the side seat surface layer. One end of the sheet member is sewn to the sewn portion. A fixing member is provided inside the seat back. The fixing member is engaged with another end of the sheet member, which is provided on the opposite side of the one end of the sheet member.

SUMMARY

An automotive seat assembly includes a seat back, an air bag disposed within the seat back, and a trim cover covering the seat back. The trim cover includes a bolster and a side facing. The bolster and side facing are attached to each other to form a seam. At least a unitary portion of the side facing (i) includes at least two panel portions folded onto each other and joined along at least one edge and (ii) is configured to direct the air bag, upon deployment, through the seam.

An automotive seat back includes an air bag, a foam pad at least partially surrounding the air bag, and a trim cover. The trim cover covers the foam pad, and includes a bolster and a one-piece double thickness side facing attached with the bolster to form a seam. At least a portion of the one-piece double thickness side facing (i) includes a panel folded onto itself and joined along at least one edge and (ii) is configured to direct the air bag, upon deployment, through the seam.

A trim cover for an automotive seat including an air bag includes a bolster and a side facing attached with the bolster to form a seam. At least a portion of the side facing (i) includes a panel folded onto itself and joined along at least one edge and (ii) is configured to direct the air bag, upon deployment, through the seam.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 1 is a front plan view of an embodiment of a seat side facing;

FIG. 2 is a rear plan view of the seat side facing of FIG. 1;

DETAILED DESCRIPTION

Figure 3:
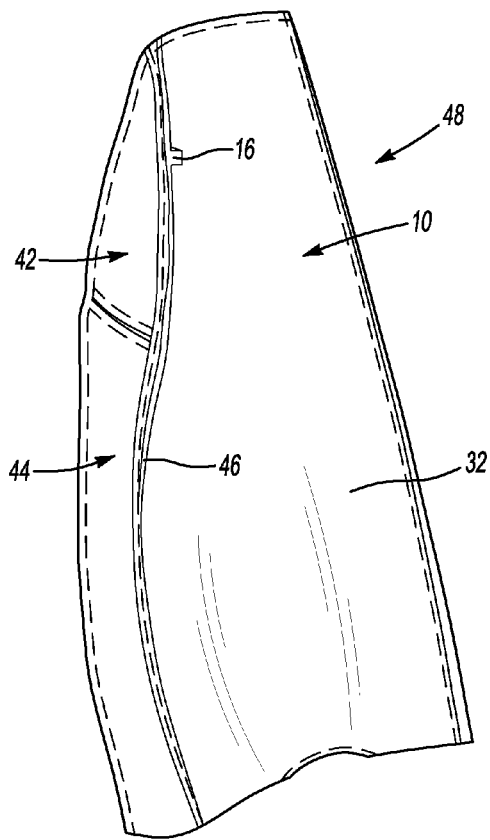
FIG. 3 is an inner view of a bolster trim cover for an automotive seat.

Referring now FIG. 1, an embodiment of a (passenger side) seat side facing 10 includes panel portions 12, 14 connected by a tab (hinge) portion 16. As explained below, the panel portions 12, 14 will be folded onto each other at the tab portion 16 to form a one-piece double thickness seat side facing 10. In other embodiments, the seat side facing 10 may include more than two panel portions. As an example, three panel portions may be connected by tab portions. The two outer panel portions may be folded onto the center panel portion to form a one-piece triple thickness seat side facing.

The panel portions 12, 14 of FIG. 1 are mirror images of each other and comprise an A-surface material, e.g., show surface material, trim cover material, etc. Of course in other embodiments, the panel portion 14 may be of a different size or shape compared with the panel portion 12. For example, the panel portion 14 may be one half or one quarter the length of the panel portion 12, etc. The size and shape of the panel portion 14, in such embodiments, may depend on the location of an air bag (not shown) relative to the seat side facing 10 (when assembled). As an example, if an air bag is to be located near the bottom of the seat side facing 10 (when assembled), the panel portions 12, 14 may form a "L" shape, with the panel portion 12 comprising the vertical leg of the "L" and the panel portion 14 comprising the horizontal leg of the "L." As another example, if an air bag is to be located near the center of the seat side facing 10 (when assembled), the panel portions 12, 14 may form a sideways "T" shape. Other configurations and arrangements are also possible. For example, the panel portions 12, 14 may be the left and right halves of a rectangular piece of trim material, etc.

The panel portion 12 includes a front edge 18, a rear edge 20 and a top edge 22. Similarly, the panel portion 14 includes a front edge 24, a rear edge 26 and a top edge 28. The tab (hinge) portion 16 shown in FIG. 1 extends from each of the front edges 18, 24. In another embodiment, the tab portion 16 may extend from each of the top edges 22, 28. That is, instead of the panel portions 12, 14 being disposed next to each other (as illustrated in FIG. 1), the panel portion 14 may be disposed above the panel portion 12. Likewise, the tab portion 16 may extend from each of the bottoms of the panel portions 12, 14. In other embodiments, there may be multiple tabs 16 that extend from any suitable portion of the panel portions 12, 14. As an example, three tab portions 16 may extend between the front edges 18, 24.

The tab (hinge) portion 16 may have any desired width. For example, the tab portion 16 may have a width substantially equal to the length of the panel portions 12, 14.

As explained below, the front edges 18, 24 may be joined with other trim pieces to form a tear seam (not shown) for a seat side air bag module (not shown). The rear edges 20, 26 and top edges 22, 28 may be joined with a retainer, insert and/or facing trim (not shown). The panel portions 12, 14 each include an A-surface (show surface) 30, 32 respectively. As explained below, the A-surface 30 will be visible when assembled with a seat (not shown), while the A-surface 32 will be hidden.

Referring now to FIG. 2, a plus pad 34, e.g., a foam pad having a desired density, etc., may be attached, e.g., tack sewn, laminated, etc., with the panel portion 12. In the embodiment of FIG. 2, the plus pad 34 is tack sewn with the panel portion 12 as indicated by stitching 36 illustrated in FIG. 1. In other embodiments, a plus pad 34 may be attached with each of the panel portions 12, 14 (or omitted).

The plus pad 34 may have the same (or different) shape relative to the panel portions 12, 14. In one embodiment, the plus pad 34 may be smaller then the panel portion 12. In such an embodiment, the location of the plus pad 34 may depend on the location of an air bag (not shown) relative to the seat side facing 10 (when assembled). As an example, if an air bag is to be located near the top of the seat side facing 10 (when assembled), the plus pad 34 may be disposed near the top of the panel portion 12. If an air bag is to be located near the center of the seat side facing 10 (when assembled), the plus pad 34 may be disposed near the center of the panel portion 14. Other arrangements are also possible.

As illustrated, the panel portions 12, 14 each include a B-surface 38, 40 respectively.

Figure 4:
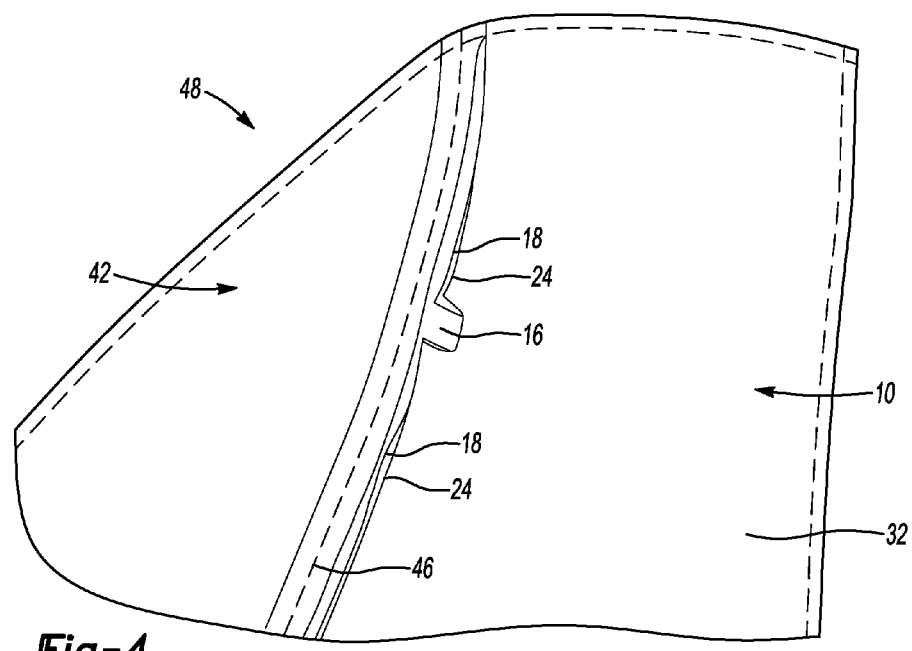
FIG. 4 is an enlarged inner view of the bolster trim cover of FIG. 3.
Figure 5:
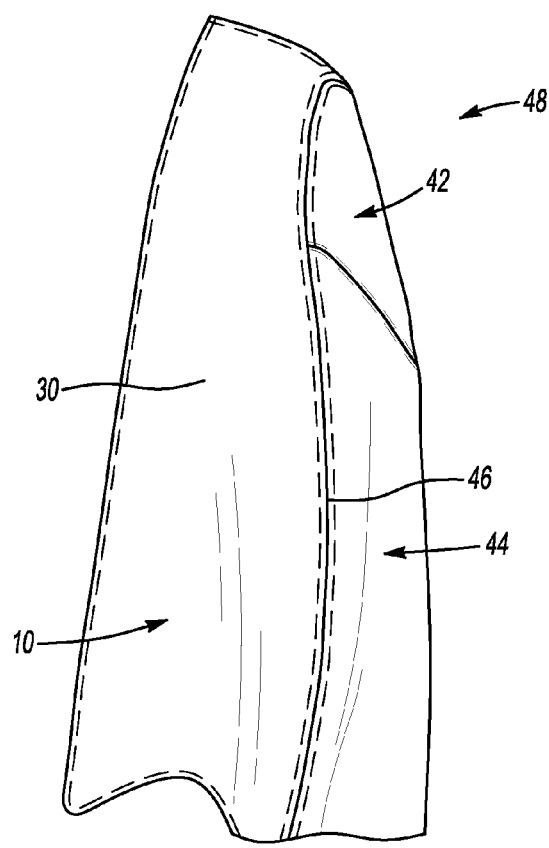
FIG. 5 is an outer view of the bolster trim cover of FIG. 3.

Referring now to FIGS. 3, 4 and 5, the seat side facing 10 has been folded onto itself so that the B-surfaces 38, 40 illustrated in FIG. 2 are adjacent to each other thus forming a double thickness. The front edges 18, 24 illustrated in FIG. 2 have been joined, e.g., tacked, sewn, etc., together. The rear edges 20, 26 and top edges 22, 28 illustrated in FIG. 2 have been similarly joined.

As discussed above, the seat side facing 10 may be joined, for example, with other trim panels 42, 44 to form a tear seam 46 of a bolster trim cover 48 for an automotive seat (not shown). Of course, decorative stitching may be used to join the seat side facing 10 with the trim panels 42, 44. In the embodiment of FIGS. 3 and 4 for example, a French seam joins the seat side facing 10 with the trim panels 42, 44. In other embodiments, the trim panels 42, 44 may be configured in a manner similar to the seat side facing 10. Any suitable configuration, however, may be used.

Figure 6:
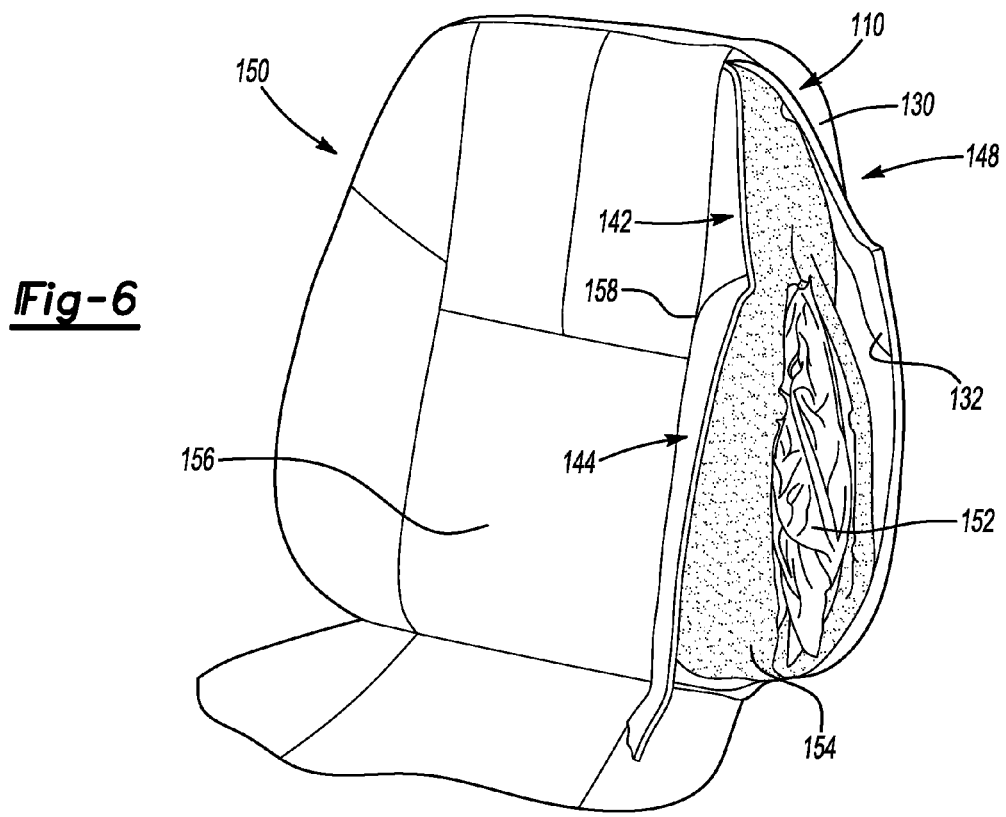
FIG. 6 is a front perspective view of an automotive vehicle seat.
Figure 7:
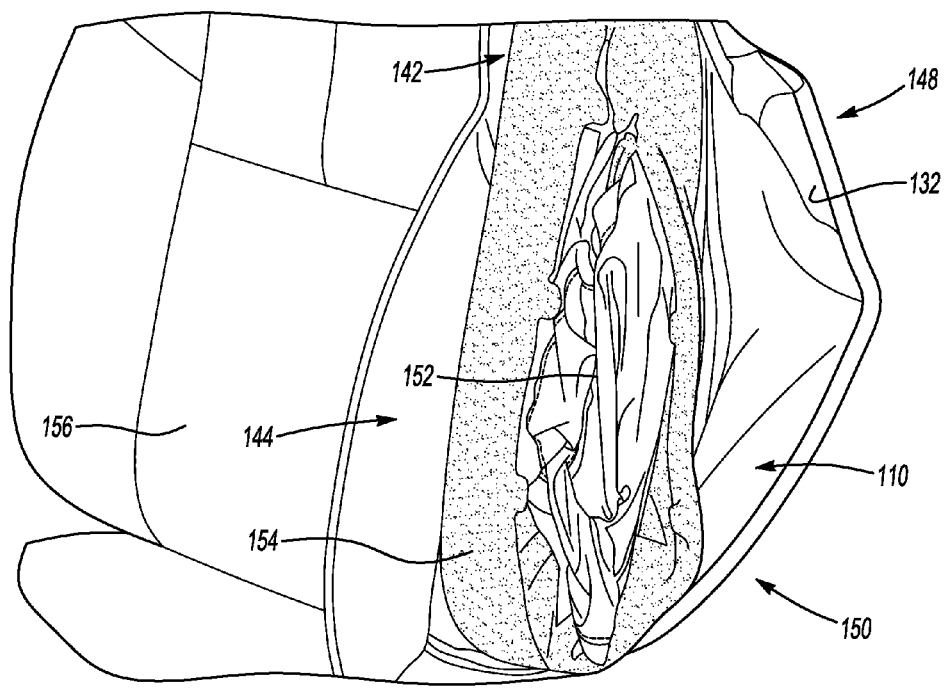
FIG. 7 is an enlarged front perspective view of the automotive vehicle seat of FIG. 6.

Referring now to FIGS. 6 and 7, an automotive seat 150 includes a (driver side) trim cover 148, an air bag 152, a foam pad 154 and an insert trim piece 156. (Numbered elements of FIGS. 6 and 7 that differ by 100 relative to numbered elements of FIGS. 1 through 5 have similar, although not necessarily identical, descriptions to the numbered elements of FIGS. 1 through 5.) The foam pad 154 partially surrounds the air bag 152. The trim cover 148 is joined with the trim piece 156 along a seam 158.

As apparent to those of ordinary skill, the air bag 152 has been deployed. The seam joining the side facing 110 and the trim panels 142, 144 has been torn open by this deployment. As the air bag 152 inflated, the side facing 110 guided/directed the inflating bag towards the now torn seam. The air bag 152 thus exited the trim cover 148 through the torn seam and not through the side facing 110.

Figure 8:
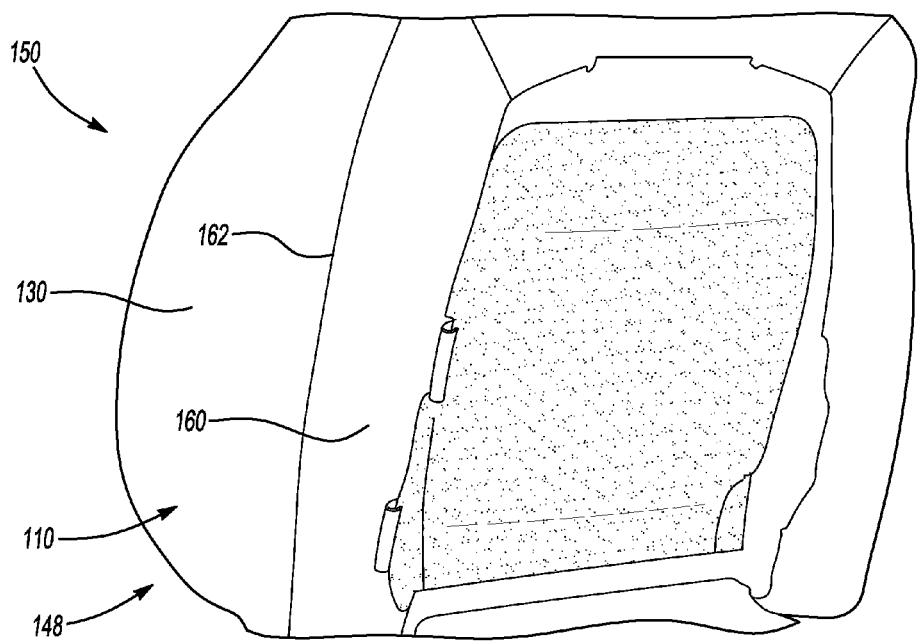
FIG. 8 is a rear perspective view of the automotive vehicle seat of FIG. 6.

Referring now to FIG. 8, the automotive seat 150 further includes a rear trim piece 160. The trim cover 148 is also joined with the rear trim piece 160 along seam 162.

While embodiments of the invention have been illustrated and described, it is not intended that these embodiments illustrate and describe all possible forms of the invention. The words used in the specification are words of description rather than limitation. It is understood that various changes may be made without departing from the spirit and scope of the invention.

What is claimed:

1. An automotive seat assembly comprising:
    a seat back;
    an air bag disposed within the seat back; and
    a trim cover covering the seat back and including a bolster and a side facing, wherein the bolster and side facing are attached to each other to form a seam and wherein at least a unitary portion of the side facing (i) includes at least two panel portions of the same material folded onto each other to form a folded portion connecting the at least two panel portions and joined along at least one edge to and (ii) is configured to direct the air bag, upon deployment, through the seam.

2. The assembly of claim 1 wherein the side facing includes at least one tab portion extending between two of the at least two panel portions.

3. The assembly of claim 2 wherein the at least two panel portions are folded at the tab portion.

4. The assembly of claim 1 wherein the at least two panel portions are shaped as mirror images of each other.

5. The assembly of claim 1 wherein at least one of the size and shape of one of the at least two panel portions is different than another of the at least two panel portions.

6. The assembly of claim 1 wherein the side facing includes a plus pad.

7. The assembly of claim 1 wherein the side facing comprises a show surface material.

8. An automotive seat back comprising:
    an air bag;
    a foam pad at least partially surrounding the air bag; and
    a trim cover covering the foam pad and including a bolster and a one-piece double thickness side facing attached with the bolster to form a seam, wherein at least a portion of the one-piece double thickness side facing (i) includes a panel of a single material folded onto itself to form a folded portion and joined along at least one edge and (ii) is configured to direct the air bag, upon deployment, through the seam.

9. The seat back of claim 8 wherein the one-piece double thickness side facing includes at least one tab portion.

10. The seat back of claim 9 wherein the panel is folded onto itself at the at least one tab portion.

11. The seat back of claim 8 wherein the one-piece double thickness side facing includes a plus pad.

12. The seat back of claim 8 wherein the one-piece double thickness side facing comprises a show surface material.

13. A trim cover for an automotive seat including an air bag, the trim cover comprising:
    a bolster; and
    a side facing attached with the bolster to form a seam, wherein at least a portion of the side facing (i) includes a panel folded onto itself to form a folded portion and joined along at least one edge and (ii) is configured to direct the air bag, upon deployment, through the seam.

14. The trim cover of claim 13 wherein the side facing further includes at least one tab portion.

15. The trim cover of claim 14 wherein the panel is folded onto itself at the at least one tab portion.

16. The trim cover of claim 13 wherein the side facing further includes a plus pad.

17. The trim cover of claim 13 wherein the side facing comprises a show surface material.

* * * * *

UNITED STATES PATENT AND TRADEMARK OFFICE
CERTIFICATE OF CORRECTION

PATENT NO.         : 8,113,539 B2
APPLICATION NO.    : 12/484699
DATED              : February 14, 2012
INVENTOR(S)        : William Joseph Paruszkiewicz et al.

It is certified that error appears in the above-identified patent and that said Letters Patent is hereby corrected as shown below:

Column 4, Lines 30-31, Claim 1:

After "at least one edge" delete "to".

Signed and Sealed this
Eighth Day of May, 2012

David J. Kappos
*Director of the United States Patent and Trademark Office*